April 23, 1968     A. RAYMOND     3,379,465

CLAMP FOR CAP MOLDINGS

Filed Oct. 18, 1966

Inventor:
Alain Raymond,
By Gordon Needleman
Atty.

United States Patent Office 3,379,465
Patented Apr. 23, 1968

3,379,465
CLAMP FOR CAP MOLDINGS
Alain Raymond, Grenoble, Isere, France, assignor to A. Raymond, Lorrach, Baden, Germany, a firm
Filed Oct. 18, 1966, Ser. No. 587,511
Claims priority, application Germany, Nov. 5, 1965, R 41,917
1 Claim. (Cl. 287—189.35)

ABSTRACT OF THE DISCLOSURE

This invention is directed at a fastening device which is U-shaped in configuration having an arm with a keyhole slot adapted to engage a stud and having means of engaging a support within the area defined by the U.

---

This invention relates generally to fastening devices and more specifically to fastener devices engaging a pinch weld.

An object of the present invention is to provide a fastener engaging a pinch weld having a stud attached thereto for engagement with a socket formed in said fastener. The invention is directed at a fastening device having a pair of flexible arms attached together to provide a U-shaped configuration with one of the arms having a keyhole slot formed therein opening at an edge thereof. The fastening device is adapted to engage a stud which extends from a portion of the support which in turn is clampingly engaged by portions of the arms.

Other objects of the invention will, in part, be obvious and will, in part, appear hereinafter.

Figure 1:
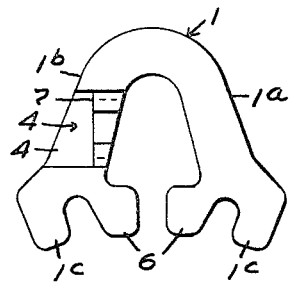
FIG. 1 is an end elevation of the fastening device.
Figure 2:
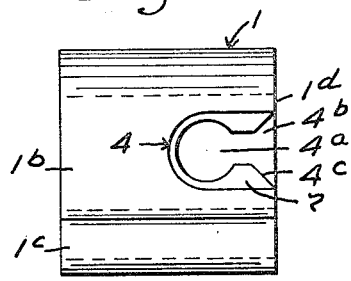
FIG. 2 is a side elevation of the fastener shown in FIG. 1.

In the drawing there is shown a fastening device or clamp 1 having a body which in side profile is in the shape of a V having a heavily rounded off apex and each of whose two arms 1a and 1b has a free terminal end or supporting edge 1c. In one of these arms, for example 1b, a keyhole slot 4 is formed, opening through a side edge 1d.

The keyhole slot or catch 4 is formed by a free cut 4a in the arm 1b which runs out through the side edge 1d through an open end 4b. The open end 4b is provided with a pair of interference elements 4c which provide a narrow throat proximate the open end 4b.

Figure 3:
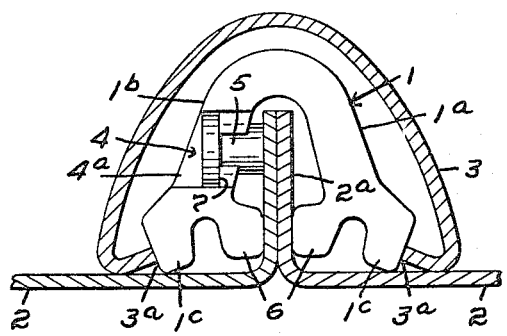
FIG. 3 is an end elevation of the fastener engaged to a support having a pinch weld and also engaged to a molding, the latter two being shown in section.

The support 2 has a pinch weld 2a formed at right angles to the plane of the support as shown in FIG. 3. A stud 5 extends from the pinch weld 2a at right angles thereto. The stud 5 is either welded, soldered, or attached in a fixed position to the pinch weld 2a.

To engage the clamp 1 to the support 2, the arms 1a and 1b are flexed away from each other and are then partially released so that extensions 6 which extend from the arms 1a and 1b toward each other in angular relationship butt against opposed sides of the pinch weld 2a as shown in FIG. 3. The arms 1a and 1b are under slightly flexed tension at this juncture. In this position of the clamp 1, the keyhole slot 4 is on the same side of the pinch weld 2a as the stud 5. The clamp 1 is now slid toward the stud 5 until the shank of the stud 5 butts against the interference element 4c of the keyhole slot 4. Then as the force is continued, the interference elements 4c are either flexed or compress away from each other allowing the shank of the stud 5 to engage within the free cut 4a of the keyhole slot 4. A shoulder 7 is formed within the free cut 4a so that the head of the stud 5 is in abutting relationship therewith when the stud 5 is fully engaged with the clamp 1. The head of the stud 5 is thus recessed. A hollow molding of the decorative type may now be engaged with the clamp 1 by snapping its free ends onto portions of the arms 1a and 1b.

With reference to the foregoing description it is to be understood that what has been disclosed herein represents only a single embodiment of the invention and is to be construed as illustrative rather than restrictive in nature and that the invention is best described by the following claim:

I claim:

1. A fastening device having a pair of flexible arms spaced from each other and connected by a bight portion providing a U-shaped configuration, one of said arms having a keyhole slot formed therethrough, said slot having a shoulder formed therein and extending in transverse relation to said arm and opening through a side edge thereof, each of said arms having a terminal end with means for engaging a support and an article to be held, said fastener adapted to be slipped by lateral movement onto a stud member extending at right angle relationship to a portion of the support, said portion of the support extending between said arms.

References Cited

UNITED STATES PATENTS

| 3,004,370 | 10/1961 | Tinnerman | 287—189.35 |
| 3,239,988 | 3/1966 | Meyer | 52—718 |
| 3,319,983 | 5/1967 | Zibell | 287—189.35 |

FOREIGN PATENTS

| 1,369,452 | 7/1964 | France. |
| 1,201,617 | 9/1965 | Germany. |

MARION PARSONS, JR., *Primary Examiner.*